(12) United States Patent
Kawasaki et al.

(10) Patent No.: US 6,604,040 B2
(45) Date of Patent: Aug. 5, 2003

(54) APPARATUS AND METHOD FOR IDENTIFYING TIRES AND APPARATUS AND METHOD FOR EVALUATING ROAD SURFACE CONDITIONS

(75) Inventors: Hiroaki Kawasaki, Kobe (JP); Yukio Nakao, Kobe (JP)

(73) Assignee: Sumitomo Rubber Industries, Limited, Kobe (JP)

( * ) Notice: Subject to any disclaimer, the term of this patent is extended or adjusted under 35 U.S.C. 154(b) by 37 days.

(21) Appl. No.: 10/006,616

(22) Filed: Dec. 10, 2001

(65) Prior Publication Data

US 2002/0116145 A1 Aug. 22, 2002

(30) Foreign Application Priority Data

Dec. 14, 2000 (JP) .......................... 2000-380609
Jan. 9, 2001 (JP) .......................... 2001-001399
Sep. 21, 2001 (JP) .......................... 2001-289256

(51) Int. Cl.⁷ .............................................. B60K 23/08
(52) U.S. Cl. .............................. 701/80; 701/74; 701/79; 701/82; 180/197
(58) Field of Search .................... 701/80, 71, 73, 701/74, 79, 82, 90, 91; 180/197; 303/176

(56) References Cited

U.S. PATENT DOCUMENTS 5,357,434 A    10/1994   Zimmer et al.  ............... 701/75
5,561,415 A    10/1996   Dieckmann et al. ......... 340/444
5,651,593 A  *  7/1997   Shitani et al. ............... 303/190
5,653,516 A  *  8/1997   Taniguchi et al. .......... 303/150
5,701,247 A  * 12/1997   Sasaki .......................... 701/1

FOREIGN PATENT DOCUMENTS

DE   43 29 745 C1    7/1994
EP   0 783 983 A1    7/1997
EP   0 890 458 A2    1/1999
JP   7-149119        6/1995

* cited by examiner

*Primary Examiner*—Thomas G. Black
*Assistant Examiner*—Arthur D. Donnelly
(74) *Attorney, Agent, or Firm*—Birch, Stewart, Kolasch & Birch, LLP.

(57) ABSTRACT

An apparatus for identifying tires comprising: a rotational speed detecting means; a first calculating means for calculating a vehicle speed; a second calculating means for calculating acceleration/deceleration of the vehicle; a third calculating means for calculating a slip ratio; a fourth calculating means for respectively obtaining moving averages of the acceleration/deceleration and the slip ratios of the vehicle; a fifth calculating means for obtaining linear regression coefficients and correlation coefficients of the moving-averaged acceleration/deceleration of the vehicle and the slip ratio; a sixth calculating means for calculating a tire identifying coefficient; and a tire identifying means for identifying tires which is presently mounted based on the tire identifying coefficient. Differences in tread rigidities of the tires can be automatically reflected for controlling the vehicle.

10 Claims, 8 Drawing Sheets

APPARATUS AND METHOD FOR IDENTIFYING TIRES AND APPARATUS AND METHOD FOR EVALUATING ROAD SURFACE CONDITIONS

BACKGROUND OF THE INVENTION

The present invention relates to an apparatus and method for identifying tires and to an apparatus and method for evaluating road surface conditions. More particularly, it relates to an apparatus and method for identifying tires for identifying a driving stiffness level of tires which is applicable for controlling a vehicle or for improving safety of the vehicle, as well as to an apparatus and method for evaluating road surface conditions for identifying presently mounted tires in case the tires have been exchanged and for suitably setting a threshold for determining a tendency of slip.

Tires are engraved with longitudinal grooves as well as lateral grooves in view of water drainage such that rubber blocks surrounded by these grooves are formed. In case these rubber blocks are large, shear deformation in front and rear, and right and left directions hardly occurs and further exhibits a large rigidity, and tires having tread patterns composed of large blocks are generally referred to as tires of a large pattern rigidity.

Since the degree of pattern rigidity largely affects slip rates in addition to cornering power and cornering force, it is important to know the pattern rigidity of tires for estimating behaviors of a vehicle on the basis of rotational information of the tires in devices aimed to improve performance and safety of the vehicle on the basis of rotational information of the tires such as an ABS (anti-lock braking system), a TCS (traction control system) or an apparatus for alarming decrease in tire air-pressure. It is generally the case that summer tires are of large pattern rigidity while winter tires are of small pattern rigidity.

A conventional apparatus for alarming decrease in air pressure for detecting a decrease in internal pressure of tires on the basis of changes in rotational speeds of tires is so arranged that it applies the fact that a decrease in air pressure of a tire causes a decrease in dynamic load radius of the tire such that its rotational speed is increased when compared to tires of normal air pressure. Japanese Unexamined Patent Publication No. 149119/1995 is one exemplary publication which suggests a method for detecting a decrease in internal pressure based on a relative difference between rotational speeds of tires. Since the rotational speed of tires is affected through factors such as turning movements, acceleration/deceleration, load or speed of the vehicle, various measures are being taken for eliminating influences thereof. It is further the case with such apparatuses for alarming decrease in tire air-pressure that tuning of vehicle factors such as correction coefficients at the time of turning movements is performed to suit tires which are mounted to a new vehicle. However, in case tires have been exchanged from summer tires to winter tires or from winter tires to summer tires, which specifications largely differ from each other, estimations of behaviors of the vehicle will be largely shifted from those as set through the initial tuning and it might happen that no accurate information to be provided to the driver can be secured. Although it is known for a method in which initial tuning is performed by using summer tires and winter tires for setting average values thereof as vehicle factors, accuracy of detection of internal pressure will still be degraded.

It is thus deemed that a most suitable method is one which identifies whether the presently mounted tires are summer tires or winter tires, that is, which identifies degrees of pattern rigidities to automatically rewrite vehicle factors accordingly.

One example of a method for identifying differences in summer tires and winter tires is a method for measuring a rising gradient (driving stiffness) of a $\mu$-s curvature of tires.

If it were possible to automatically identify whether the mounted tires are summer tires or winter tires in an apparatus for alarming decrease in internal pressure of tires, it would be possible to remarkably improve its detection accuracy. However, in case tires are to be identified on the basis of rising gradients of $\mu$-s curvatures of tires, since such rising gradients will be varied not only through pattern rigidities of treads but also through friction coefficients of road surfaces, it is quite difficult to apply the same for identifying tires unless measures are taken such as restricting road surfaces for performing measurement.

On the other hand, there is another method for estimating tendency of slip (friction coefficient) between tires and road surfaces on the basis of rotational speed information of tires during running.

Such a method utilizes the fact that rising gradients of $\mu$-s curvatures of tires and road surfaces differ depending on road surface friction efficiencies $\mu$, wherein rotational speeds of wheels are periodically detected through, for instance, an ABS sensor for calculating slip ratios of front and rear wheels and acceleration of following wheels so as to obtain a gradient as a judged value. The obtained judged value is compared with a preliminarily set threshold for estimating a tendency of slip (road surface) $\mu$. However, this threshold needs to be varied depending on stiffness of the tires or load applied onto the tires.

In order to cope with this problem, it would be possible to provide the vehicle with a switch for switching between summer tire mode and winter tire mode and to preliminarily set different thresholds for the summer tires and the winter tires which largely differ in stiffness from each other.

However, such switching between two types of modes might lead to a drawback that the accuracy of determining road surface conditions is degraded owing to the fact that differences in rising gradients exist also among summer tires (winter tires) depending on manufacturers or patterns, and that differences in rising gradients are also caused through wear conditions of tires.

The present invention has been made in view of the above-mentioned facts, and it is a first object thereof to provide an apparatus and method for identifying tires for identifying whether the presently mounted tires are summer tires or winter tires.

It is a second object thereof to provide an apparatus and method for evaluating road surface conditions for setting a threshold upon identifying presently mounted tires and accurately determining a tendency of slip.

SUMMARY OF THE INVENTION

In accordance with a first aspect of the present invention, there is provided an apparatus for identifying tires comprising: a rotational speed detecting means for periodically detecting rotational speeds of tires of four wheels of a vehicle; a first calculating means for calculating a vehicle speed based on a measured value obtained by the rotational speed detecting means; a second calculating means for calculating acceleration/deceleration of the vehicle; a third calculating means for calculating a slip ratio from the rotational speeds of the four wheels; a fourth calculating means for respectively obtaining moving averages of the acceleration/deceleration and the slip ratios of the vehicle; a fifth calculating means for obtaining linear regression coefficients and correlation coefficients of the moving-averaged acceleration/deceleration of the vehicle and the slip ratio; a sixth calculating means for calculating a tire identifying coefficient based on the linear regression coefficients of which correlation coefficients of are not less than a specified value; and a tire identifying means for identifying tires which is presently mounted based on the tire identifying coefficient.

In accordance with a second aspect of the present invention, there is provided a method for identifying tires comprising the steps of: periodically detecting rotational speeds of tires of four wheels of a vehicle; calculating a vehicle speed based on the measured rotational speed; calculating acceleration/deceleration of the vehicle; calculating a slip ratio from the rotational speeds of the four wheels; respectively obtaining moving averages of the acceleration/deceleration and the slip ratios of the vehicle; obtaining linear regression coefficients and correlation coefficients of the moving-averaged acceleration/deceleration of the vehicle and the slip ratio; calculating a tire identifying coefficient based on the linear regression coefficients of which correlation coefficients are not less than a specified value; and identifying tires which is presently mounted based on the tire identifying coefficient.

In accordance with a third aspect of the present invention, there is provided an apparatus for evaluating road surface conditions comprising: a rotational speed detecting means for periodically detecting rotational speeds of tires of four wheels of a vehicle; a first calculating means for calculating a vehicle speed based on a measured value obtained by the rotational speed detecting means; a second calculating means for calculating acceleration/deceleration of the vehicle; a third calculating means for calculating a slip ratio from the rotational speeds of the four wheels; a fourth calculating means for respectively obtaining moving averages of the acceleration/deceleration and the slip ratios of the vehicle; a fifth calculating means for obtaining linear regression coefficients and correlation coefficients of the moving-averaged acceleration/deceleration of the vehicle and the slip ratios; and a threshold setting means for setting a threshold for evaluating road surface conditions based on the linear regression coefficients of which correlation coefficients are not less than a specified value.

In accordance with a fourth aspect of the present invention, there is provided a method for evaluating road surface conditions comprising the steps of: periodically detecting rotational speeds of tires of four wheels of a vehicle; calculating a vehicle speed based on a measured value obtained by the rotational speed detecting means; calculating acceleration/deceleration of the vehicle; calculating a slip ratio from the rotational speeds of the four wheels; respectively obtaining moving averages of the acceleration/deceleration and the slip ratios of the vehicle; obtaining linear regression coefficients and correlation coefficients of the moving-averaged acceleration/deceleration of the vehicle and the slip ratios; and setting a threshold for evaluating road surface conditions based on the linear regression coefficients of which correlation coefficients are not less than a specified value.

In accordance with a fifth aspect of the present invention, there is provided a program for evaluating road surface conditions which makes a computer for evaluating road surface conditions function as a first calculating means for calculating a vehicle speed based on a measured value obtained by a rotational speed detecting means, a second calculating means for calculating acceleration/deceleration of the vehicle, a third calculating means for calculating a slip ratio from the rotational speeds of the four wheels, a fourth calculating means for respectively obtaining moving averages of the acceleration/deceleration and the slip ratios of the vehicle, a fifth calculating means for obtaining linear regression coefficients and correlation coefficients of the moving-averaged acceleration/deceleration of the vehicle and the slip ratios, and a threshold setting means for setting a threshold for evaluating road surface conditions based on the linear regression coefficients of which correlation coefficients are not less than a specified value.

BRIEF DESCRIPTION OF THE DRAWINGS

FIGS. 6($a$) and 6($b$) are diagrams for illustrating ratios in which linear regression coefficients become larger than thresholds when running on a dry asphalt road in Embodiments 3 and 4, respectively;

FIGS. 7($a$) and 7($b$) are diagrams for illustrating ratios in which linear regression coefficients become larger than thresholds when running on a compressed snowy road in Embodiments 3 and 4, respectively; and FIGS. 8($a$) and 8($b$) are diagrams for illustrating ratios in which linear regression coefficients become larger than thresholds when running on frozen snowy road in Embodiments 3 and 4, respectively.

DETAILED DESCRIPTION

The apparatus and method for identifying tires, the apparatus and method for evaluating road surface conditions, and the program for evaluating road surface conditions according to the present invention will now be explained with reference to the accompanying drawings.

Figure 1:
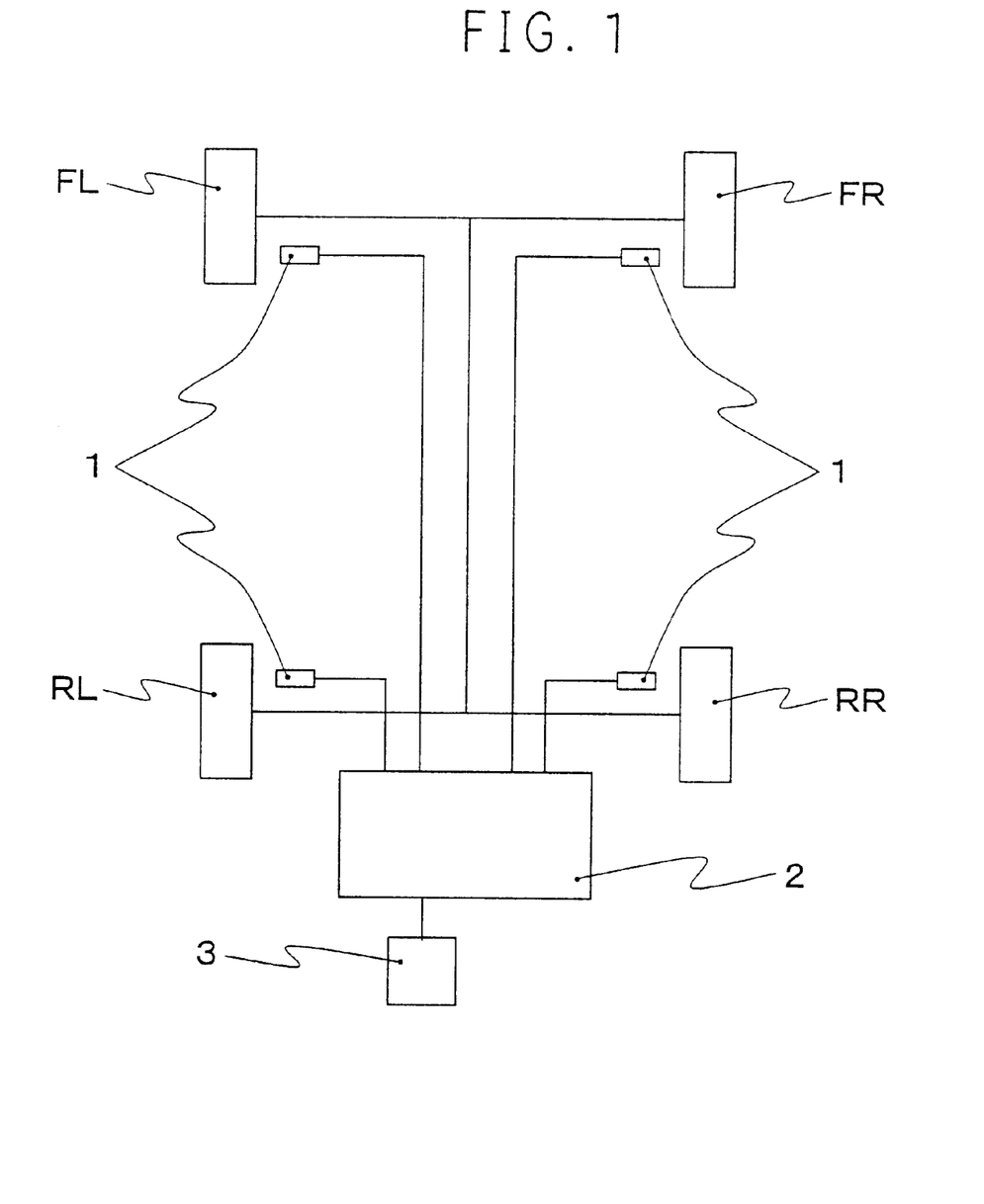
FIG. 1 is a block diagram illustrating an apparatus for identifying tires according to the present invention.

As shown in FIG. 1, an apparatus for identifying tires of the present invention is provided with a wheel speed sensor 1, which is a rotational speed detecting means for periodically detecting rotational speed of tires, attached to tires FL, FR, RL and RR of a four-wheeled vehicle. Output of the wheel speed sensor 1 is supplied to a control unit such as ABS. Numeral 3 denotes an initialization switch 4 capable of being operated by a driver when, for example, tires are changed.

The wheel speed sensor 1 takes the form of, for example, a sensor for measuring a rotational speed from the number of rotation pulses generated by using an electromagnetic pickup or the like.

Figure 2:
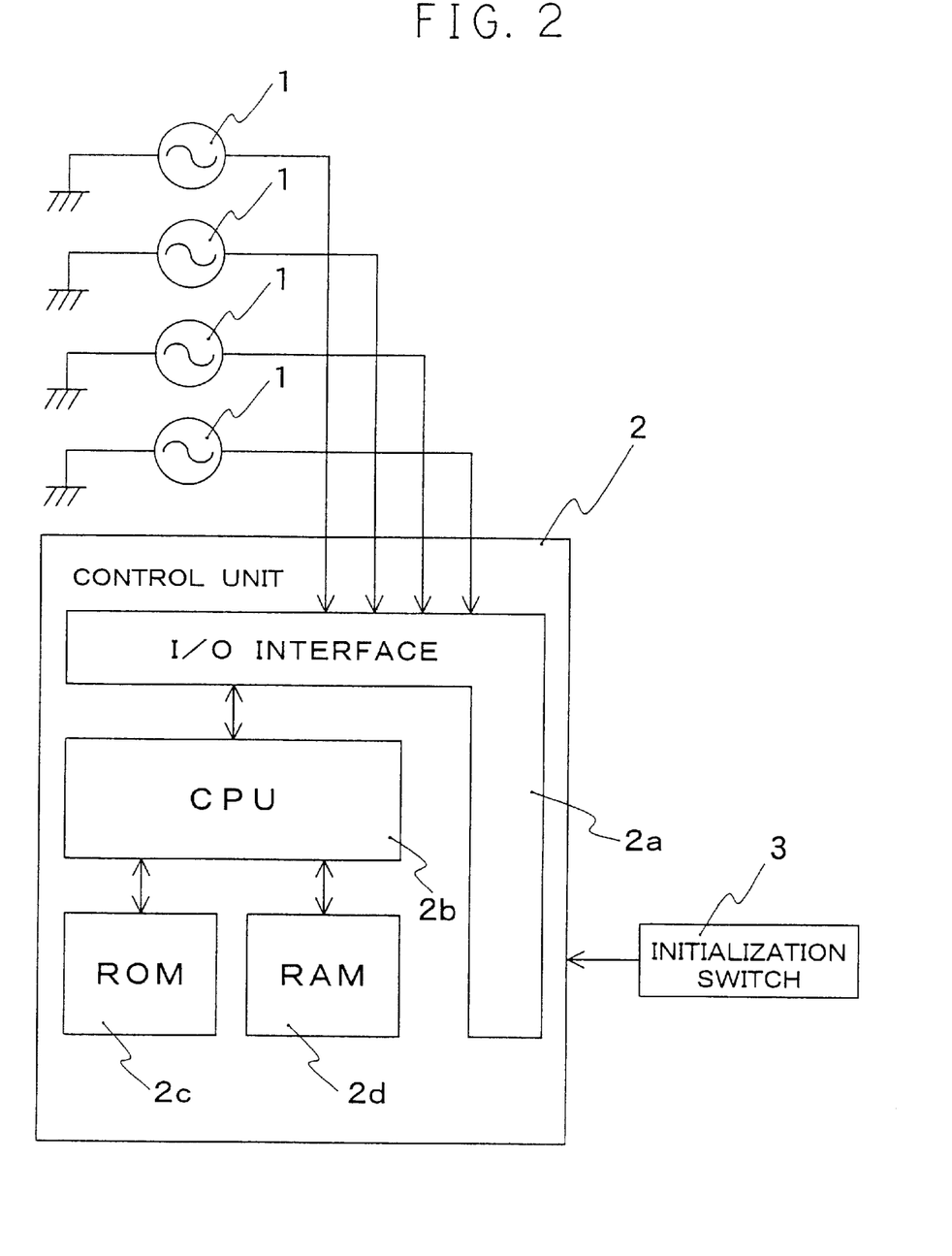
FIG. 2 is a block diagram illustrating electric arrangements of the apparatus for identifying tires of FIG. 1.

The control unit 2 includes, as shown in FIG. 2, an I/O interface 2$a$ required for giving and taking a signal with respect to an external device, a CPU 2$b$ functioning as a center of a calculating process, a ROM 2$c$ storing a control operation program of the CPU 2$b$ and a RAM 2$d$ in which data is temporarily written or the written data is read at a time when the CPU 2b executes the control operation.

In the present embodiment, the control unit 2 is provided with a first calculating means for calculating a vehicle speed based on a measured value obtained by the rotational speed detecting means, a second calculating means for calculating a running distance of the vehicle, a third calculating means for calculating acceleration/deceleration of the vehicle, a fourth calculating means for calculating a slip ratio from the rotational speeds of the four wheels, a fifth calculating means for respectively obtaining moving averages of the acceleration/deceleration and the slip ratios of the vehicle, a sixth calculating means for accumulating and calculating data related to the moving-averaged acceleration/deceleration of the vehicle and the slip ratios until the calculated running distance has reached a specified distance and obtaining linear regression coefficients and correlation coefficients thereof, a seventh calculating means for calculating a tire identifying coefficient based on the linear regression coefficients of which correlation coefficients are not less than a specified value, and a tire identifying means for identifying tires which is presently mounted based on the tire identifying coefficient. It should be noted that, while the present embodiment will now be explained in which data related to the moving-averaged acceleration/deceleration of the vehicle and the slip ratios until the running distance calculated by the third calculating means for calculating acceleration/deceleration of the vehicle has reached a specified distance are accumulated and calculated and linear regression coefficients and correlation coefficients thereof are obtained, the present invention is not limited to this arrangement. It is alternatively possible to obtain the linear regression coefficients and the correlation coefficients of the moving-averaged acceleration/deceleration and the slip ratios of the vehicle on the basis of accumulating time or number of accumulated data instead of the running distance. In this case, the second calculating means will be substituted by a calculating means for calculating the accumulating time or the number of accumulated data and the sixth calculating means by a calculating means for obtaining linear regression coefficients and the correlation coefficient of the moving-averaged acceleration/deceleration and the slip ratios of the vehicle on the basis of the accumulating time or number of accumulated data.

In general, winter tires are tires of which tread patterns or materials have been varied to enable running on snowy road and are tires bearing indications at side wall portions thereof such as "SNOW", "M+S", "STUDLESS", "ALL WEATHER" or "ALL SEASON", whereas summer tires are tires which are not provided with such indications at side wall portions thereof unlike winter tires. In the present specification, however, differences between summer tires and winter tires also include differences in degrees of pattern rigidity of the treads regardless of the presence or absence of such indications. More particularly, tires of which pattern rigidity, which affects control of the vehicle and accuracy of detection of internal pressure of tires, is large are summer tires while tires of small pattern rigidity are winter tires.

In the present embodiment, the rotational speed of the tires of the four wheels is detected in a period of not more than 0.1 seconds, and preferably not more than 0.05 seconds. The vehicle speed and the running distance are calculated on the basis of the rotational speed of the four wheels and the dynamic load radius of the tires. While the acceleration/deceleration of the vehicle might be measured using a G sensor, it is preferable to calculate the same by differentiating the vehicle speed in view of costs. The slip ratio might be obtained, for instance, as (front and rear tire ratio −1).

The acceleration/deceleration of the vehicle and the slip ratio are subjected to moving averaging for every sampling time as average values of data of a specified time period such as at least 0.1 seconds to obtain moving-averaged values (a specified number of slip ratios and acceleration/deceleration of the vehicle).

Data related to the moving-averaged acceleration/deceleration of the vehicle and the slip ratio until the running distance has reached a specified distance are accumulated, and by utilizing the accumulated data, linear regression coefficients and correlation coefficients of the slip ratios and the acceleration/deceleration of the vehicle are obtained. It is preferable that data in which the acceleration/deceleration of the vehicle as obtained by moving-averaging is not more than a specified value (for instance, in the case of not more than −0.03G) or obtained during braking are not used for the calculation of the regression coefficient. This is due to the fact that no accurate slip ratios can be obtained since braking force is applied to the four wheels during deceleration, especially during braking.

Actions of the apparatus for identifying tires according to the present embodiment will now be explained with reference to steps [1] to [8].

[1] Wheel speeds ($V1_n$, $V2_n$, $V3_n$, $V4_n$) are calculated from the respective rotational speeds of the four tires FL, FR, RL and RR of the vehicle.

Wheel speed data obtained from a sensor such as an ABS sensor at some point in time for the respective wheel tires FL, FR, RL and RR of the vehicle are defined to be wheel speeds $V1_n$, $V2_n$, $V3_n$, $V4_n$.

[2] Next, average wheel speeds ($Vf_n$, $Vd_n$) of following wheels and driving wheels are calculated.

In the case of a front drive vehicle, average wheel speeds $Vf_n$, $Vd_n$ of following wheels and driving wheels at some point in time can be obtained from the following equations (1), (2).

$$Vf_n=(V3_n+V4_n)/2 \tag{1}$$

$$Vd_n=(V1_n+V2_n)/2 \tag{2}$$

[3] Thereafter, the running distance of the vehicle per unit time is calculated from the following equation (3).

$$\text{DIST}=Vf_n \times \Delta t \tag{3}$$

Here, $\Delta t$ indicates a time interval (sampling time) between $Vf_n$ and $Vf_{n-1}$ of the following wheels as calculated from the wheel speed data.

[4] The average wheel acceleration/deceleration of the following wheels, that is, the acceleration/deceleration of the vehicle $Af_n$ is calculated.

The acceleration/deceleration speed of the vehicle $Af_n$ can be obtained from the following equation (4) in case the wheel speed which has been obtained immediately before the average wheel speed of the following wheels $Vf_n$ is defined as average wheel speed $Vf_{n-1}$.

$$Af_n=(Vf_{n-1}Vf_{n-1})\Delta t/g \tag{4}$$

Here, $\Delta t$ indicates a time interval (sampling time) between $Vf_n$ and $Vf_{n-1}$ of the following wheels as calculated from the wheel speed data, while g indicates gravity acceleration. As for the sampling time, it needs to be not more than 0.1 second for reducing variations in data while enabling evaluation in a short time. More preferably, it is set to not more than 0.05 second.

[5] The slip ratio is calculated in accordance with the acceleration/deceleration $Af_n$ of the vehicle.

The slip ratio $S_n$ is calculated from the following equations (5), (6) on the provision that there cannot be occurred a case whterein the vehicle during acceleration is slipping with the driving wheels being in locked conditions ($Vd_n=0$, $Vf_n \neq 0$) or a case wherein the driving wheels of the vehicle during deceleration in wheel spinning conditions while the vehicle is in a halted condition ($Vf_n=0$, $Vd_n \neq 0$).

In case $Af_n \geq 0$ and $Vd_n \neq 0$ are satisfied, $$S_n = (Vf_n - Vd_n)/Vd_n \qquad (5)$$

In case $Af_n < 0$ and $Vf_n \neq 0$ are satisfied, $$S_n = (Vf_n - Vd_n)/Vf_n \qquad (6)$$

At all other cases, $S_n = 1$ shall be satisfied.

[6] Then, moving-averaging of the acceleration/deceleration of the vehicle and the slip ratios is performed for each sampling time.

A number of data exceeding a certain amount is required in performing linear regression, else the reliability of the obtained regression coefficient will be degraded. Thus, data are sampled for each sampling time, for example, several tens of ms, and upon performing moving-averaging of data of large variations which have been obtained during the sampling time, such variations in data can be reduced without decreasing the number of data. Here, N indicates the number of data.

As for the slip ratio, $$MS_n = (S_1 + S_2 + \ldots + S_n)/N \qquad (7)$$

$$MS_{n+1} = (S_2 + S_3 + \ldots + S_{n+1})/N \qquad (8)$$

$$MS_{n+2} = (S_3 + S_4 + \ldots + S_{n+2})/N \qquad (9)$$

As for the acceleration/deceleration of the vehicle, $$MAf_n = (Af_1 + Af_2 + \ldots + Af_n)/N \qquad (10)$$

$$MAf_{n+1} = (Af_2 + Af_3 + \ldots + Af_{n+1})/N \qquad (11)$$

$$MAf_{n+2} = (Af_3 + Af_4 + \ldots + Af_{n+2})/N \qquad (12)$$

[7] Thereafter, data (moving-averaged acceleration/deceleration of the vehicle and slip ratios) are accumulated until the running distance has reached a specified distance. Respective linear regression coefficients of the slip ratios and the acceleration/deceleration of the vehicle, that is, a regression coefficient K1 of the slip ratio to the acceleration/deceleration of the vehicle and a regression coefficient K2 of the acceleration/deceleration of the vehicle to the slip ratio are respectively obtained from the following equations (13), (14).

$$K1 = (\Sigma(MAf_i \times MS_i) - N \times \overline{MAf} \times \overline{MS})/(\Sigma MAf_i^2 - N \times \overline{MAf} \times \overline{MAf}) \qquad (13)$$

$$K2 = (\Sigma(MAf_i \times MS_i) - N \times \overline{MAf} \times \overline{MS})/(\Sigma MS_i^2 - N \times \overline{MS} \times \overline{MS}) \qquad (14)$$

Here, $\overline{MAf}$ and $\overline{MS}$ indicate average values of N-number of slip ratios and accelerations/decelerations of the vehicle which have been respectively moving-averaged. For instance, the regression coefficient K1 is 0.12 and the regression coefficient K2 is 7.27 as it is evident from TABLE 1.

TABLE 1

| N | MAf | MS | MAf × MS | MAf² | MS² |
|---|-----|-----|----------|------|-----|
| 1 | 0.0270 | 0.0075 | 0.000203 | 0.000729 | 0.00005625 |
| 2 | 0.0260 | 0.0073 | 0.00019 | 0.000676 | 0.00005329 |
| 3 | 0.0250 | 0.0073 | 0.000183 | 0.000625 | 0.00005329 |
| 4 | 0.0240 | 0.0071 | 0.00017 | 0.000576 | 0.00005041 |
| 5 | 0.0260 | 0.0074 | 0.000192 | 0.000676 | 0.00005476 |
| Total | 0.128 | 0.0366 | 0.0009376 | 0.003282 | 0.000268 |
| Average | 0.0256 | 0.00732 | — | — | — |

Correlation coefficient R will be $$R = K1 \times K2 \qquad (15)$$

[8] A specified number of regression coefficients K1 or regression coefficients K2 (wherein the following explanations are made by referring to regression coefficients K1) of which correlation coefficients R obtained through the above step are not less than a specified value (for instance, 0.9) are accumulated and an average value thereof is obtained. A value obtained by multiplying the average value of the coefficients K1 by a vehicle constant Wr/W is defined to be a tire identifying coefficient. Here, W indicates a vehicle weight while Wr indicates driving wheel load. Since a driving force F ($F = W \times Af_n$) required for accelerating the vehicle is determined by friction force between the driving wheels and the road surface, $F = \mu \times Wr$ will be satisfied when using the friction coefficient $\mu$ of the road surface so that it is possible to express as $Af_n = \mu \times Wr/W$. It is possible to correct differences between vehicles by multiplying the vehicle coefficient Wr/W. It is further possible to continuously obtain and update the tire identifying coefficients during running. In this case, it is preferable to employ a method in which the tire identifying coefficient is first calculated when a regression coefficient, of which correlation coefficient R is no less that the specified value, has been obtained whereupon averaging thereof by older tire identifying coefficients is performed. In this manner, it is possible to cope with changes of tires with the passage of time as well. More particularly, it is possible to cope with cases in which the winter tires are worn or in which a hardness of the tread rubber has increased due to changes with the passage of time. Further, by performing averaging, it is possible to restrict influences of one or two inappropriate regression coefficients, if ever obtained, to a minimum level and to converge proximate to values which are most frequently obtained. For instance, in case the first tire identifying coefficient is 0.059 and the next obtained tire identifying coefficient is 0.057, the tire identifying coefficient will be (0.059+0.057)/2=0.058. In case an additional tire identifying coefficient 0.055 is obtained, the tire identifying coefficient will become (0.059+0.057+0.055)/3=0.057. In case the tire identifying coefficient is not less than 0.055, it is deemed that the tires are winter tires. This threshold of (0.05) is obtained through experimental values which have been obtained so far.

It should be noted that in case data (relationship between acceleration/deceleration of the vehicle and slip ratio) accumulated during running a specified distance exhibit high linearity, the friction coefficient $\mu$ of the road surface is stable, and it may be determined that the road is an asphalt road. On the other hand, in case the linearity of the data is low, it is determined that the road is a low $\mu$ road with unstable $\mu$ such that no tire identifying coefficients are obtained. Thus, hardly any tire identification is performed when running on compressed snowy roads or on frozen snow.

While the apparatus for identifying tires according to the present invention will now be explained based on examples thereof, the present invention is not to be limited to these examples only.

EXAMPLES 1 and 2

Summer tires or winter tires were mounted to a front drive vehicle. The summer tires were FM901 manufactured by Sumitomo Rubber Industries, Ltd. while the winter tires were Glass Pick DS-1 manufactured by Sumitomo Rubber Industries, Ltd. As for the road surface of running, the summer tires were made to run on a dry asphalt road whereas the winter tires were made to run on a dry asphalt road, a compressed snowy road and a frozen snowy road.

Linear regression coefficients K1 and correlation coefficients R of acceleration/deceleration of the vehicle to the slip ratio were obtained every 500 m of running distance according to the above-described steps. At this time, 10 of regression coefficients K1, of which correlation coefficient R were not less than 0.9, multiplied by the vehicle constant (0.62) were accumulated whereupon the tires were identified based on an averaged value thereof.

Tire identifying coefficients, of which correlation coefficients R were not less than 0.9, of the respective tires and average values thereof are shown in TABLE 2.

TABLE 2

|       | 1     | 2     | 3     | 4     | 5     | 6     |
|-------|-------|-------|-------|-------|-------|-------|
| FM901 | 0.024 | 0.023 | 0.021 | 0.022 | 0.023 | 0.023 |
| DS-1  | 0.058 | 0.063 | 0.055 | 0.059 | 0.059 | 0.056 |
|       | 7     | 8     | 9     | 10    | Average |     |
| FM901 | 0.020 | 0.020 | 0.022 | 0.020 | 0.022 |     |
| DS-1  | 0.060 | 0.053 | 0.065 | 0.060 | 0.059 |     |

In the case of the summer tires FM901, the tire identifying coefficients, of which correlation coefficients R were not less than 0.9, were continuously in the range of 0.20 to 0.24. On the other hand, in the case of the winter tires DS-1, values of the tire identifying coefficients were ranging from 0.56 to 0.65 which were continuously larger than those of FM901, and it is obvious that it is possible to identify summer tires and winter tires.

Next, the apparatus and method for evaluating road surface conditions as well as the program for evaluating road surface conditions according to the present invention will now be explained.

Figure 3:
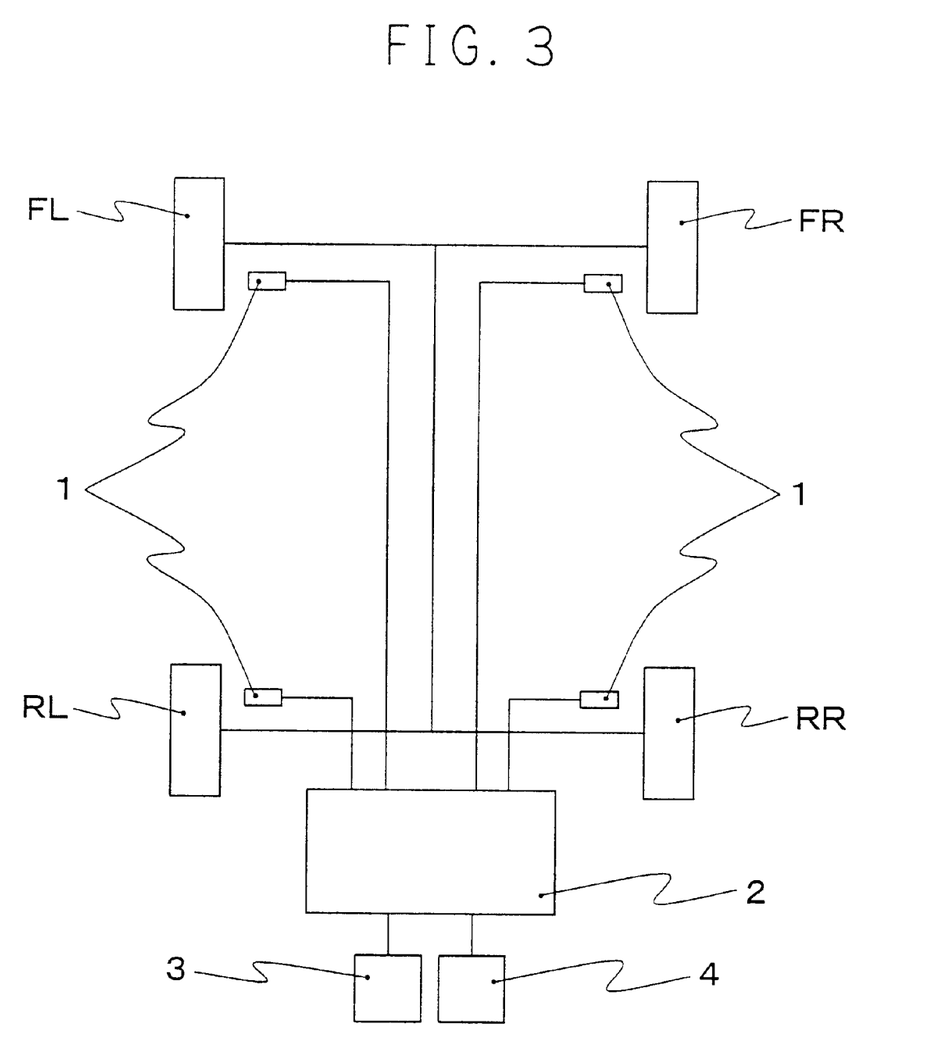
FIG. 3 is a block diagram illustrating an apparatus for evaluating road surface conditions according to the present invention.
Figure 4:
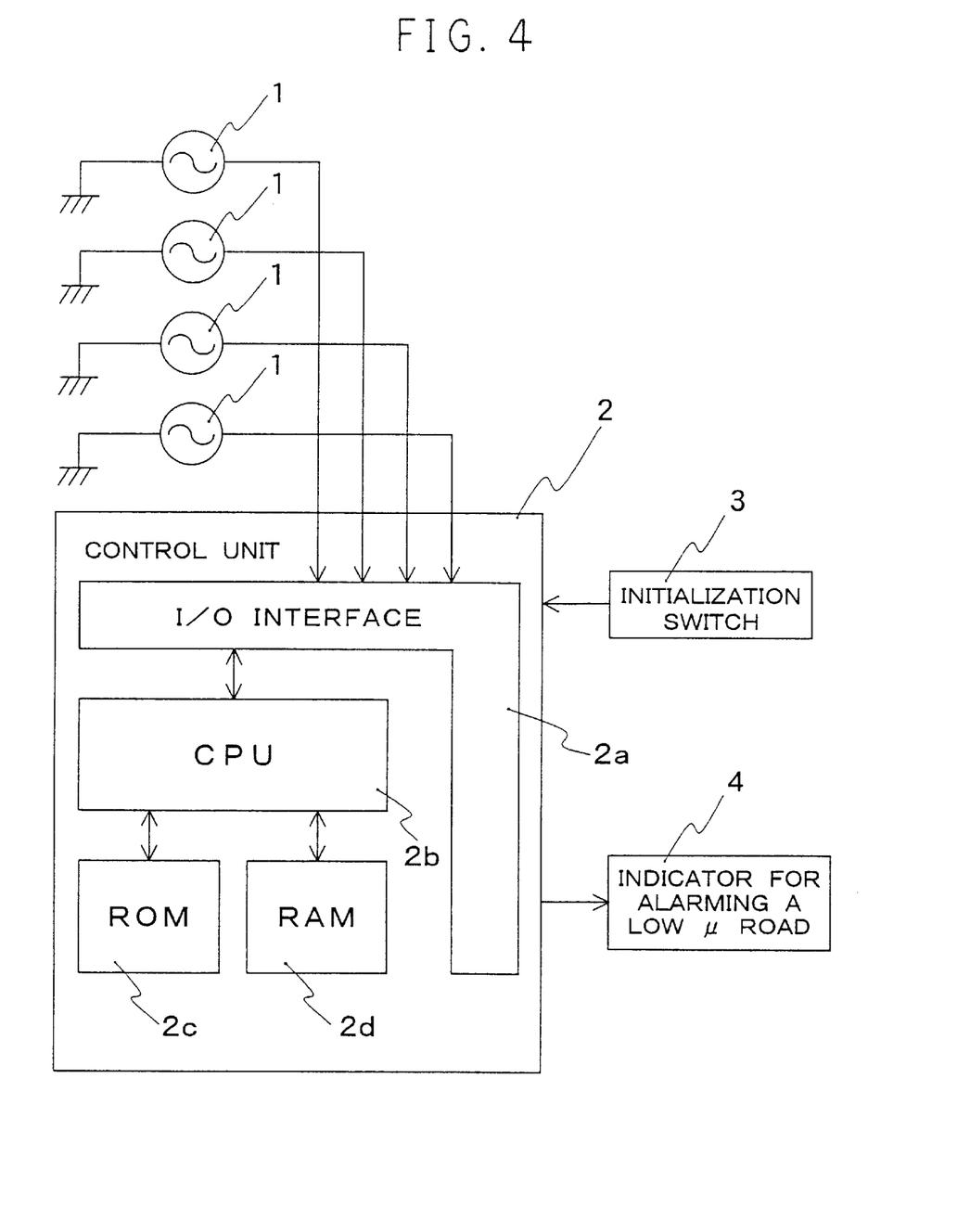
FIG. 4 is a block diagram illustrating electric arrangements of the apparatus for evaluating road surface conditions of FIG. 3.

As illustrated in FIGS. 3 and 4, the apparatus for evaluating road surface conditions according to the present invention is provided with a rotational speed detecting means 1 similar to the apparatus for identifying tires, wherein output of the rotational speed detecting means 1 are transmitted to a control unit 2 which is a computer such as an ABS. Note that numeral 3 denotes an initialization switch capable of being operated by a driver, and 4 an indicator for alarming a low $\mu$ road.

In the present embodiment, the control unit 2 is provided with a first calculating means for calculating a vehicle speed based on a measured value obtained by the rotational speed detecting means 1, a second calculating means for calculating a running distance, a third calculating means for calculating acceleration/deceleration of the vehicle, a fourth calculating means for calculating a slip ratio from the rotational speeds of the four wheels, a fifth calculating means for respectively obtaining moving averages of the acceleration/deceleration and the slip ratios of the vehicle, a sixth calculating means for accumulating and calculating data related to the moving-averaged acceleration/deceleration of the vehicle and the slip ratios until the calculated running distance has reached a specified distance and obtaining linear regression coefficients and correlation coefficients thereof, and a threshold setting means for setting a threshold for evaluating road surface conditions based on the linear regression coefficients of which correlation coefficients are not less than a specified value. It should be noted that, while the present embodiment will now be explained in which data related to the moving-averaged acceleration/deceleration of the vehicle and the slip ratios until the running distance calculated by the third calculating means for calculating acceleration/deceleration of the vehicle has reached a specified distance are accumulated and calculated and linear regression coefficients and correlation coefficients thereof are obtained, the present invention is not limited to this arrangement, It is alternatively possible to obtain the linear regression coefficients and the correlation coefficients of the moving-averaged acceleration/deceleration and the slip ratios of the vehicle on the basis of accumulating time or number of accumulated data instead of the running distance. In this case, the second calculating means will be substituted by a calculating means for calculating the accumulating time or the number of accumulated data and the sixth calculating means by a calculating means for obtaining linear regression coefficients and correlation coefficients of the moving-averaged acceleration/deceleration and the slip ratios of the vehicle on the basis of the accumulating time or number of accumulated data.

In the program for evaluating road surface conditions according to the present invention, the control unit 2 is made to function as a first calculating means for calculating a vehicle speed based on a measured value obtained by a rotational speed detecting means, a second calculating means for calculating acceleration/deceleration of the vehicle, a third calculating means for calculating a slip ratio from the rotational speeds of the four wheels, a fourth calculating means for respectively obtaining moving averages of the acceleration/deceleration and the slip ratios of the vehicle, a fifth calculating means for obtaining linear regression coefficients and correlation coefficients of the moving-averaged acceleration/deceleration of the vehicle and the slip ratios, and a threshold setting means for setting a threshold for evaluating road surface conditions based on linear regression coefficients of which correlation coefficients are not less than a specified value.

The control unit 2 is further made to function as a calculating means for calculating a running distance of the vehicle in case the linear regression coefficients and correlation coefficients are obtained from data related to acceleration/deceleration of the vehicle and slip ratios which have been moving-averaged until the running distance of the vehicle has reached a specified distance.

Actions of the apparatus for evaluating road surface conditions according to the present embodiment will now be explained with reference to steps (1) to (7). While steps (1) to (6) are substantially identical to the above steps [1] to [6] these steps will be repeated for ease of understanding of the steps of the present invention.

(1) Wheel speeds ($V1_n$, $V2_n$, $V3_n$, $V4_n$) are calculated from the respective rotational speeds of the four tires FL, FR, RL and RR of the vehicle.

Wheel speed data obtained from a sensor such as an ABS sensor at some point in time for the respective wheel tires FL, FR, RL and RR of the vehicle are defined to be wheel speeds $V1_n$, $V2_n$, $V3_n$, $V4_n$.

(2) Next, average wheel speeds ($Vf_n$, $Vd_n$) of following wheels and driving wheels are calculated.

In the case of a front drive vehicle, average wheel speeds $Vf_n$, $Vd_1$ of following wheels and driving wheels at some point in time can be obtained from the following equations (1), (2).

$$Vf_n=(V3_n+V4_n)/2 \quad (1)$$

$$VD_n=(V1_n+V2_n)/2 \quad (2)$$

(3) Thereafter, the running distance of the vehicle per unit time is calculated from the following equation (3).

$$DIST=Vf_n \times \Delta t \quad (3)$$

Here, $\Delta t$ indicates a time interval (sampling time) between $Vf_n$ and $Vf_{n-1}$ of the following wheels as calculated from the wheel speed data.

(4) The average wheel acceleration/deceleration of the following wheels, that is, the acceleration/deceleration of the vehicle $Af_n$ is calculated.

The acceleration/deceleration speed of the vehicle $Af_n$ can be obtained from the following equation (4) in case the wheel speed which has been obtained immediately before the average wheel speed of the following wheels $Vf_n$ is defined as average wheel speed $Vf_{n-1}$.

$$Af_n=(Vf_n-Vf_{n-1})/\Delta t/g \quad (4)$$

Here, $\Delta t$ indicates a time interval (sampling time) between $Vf_n$ and $Vf_{n-1}$ of the following wheels as calculated from the wheel speed data, while g indicates gravity acceleration. As for the sampling time, it needs to be not more than 0.1 second for reducing variations in data while enabling evaluation in a short time. More preferably, it is set to not more than 0.05 second.

(5) The slip ratio is calculated in accordance with the acceleration/deceleration $Af_n$ of the vehicle.

The slip ratio $S_n$ is calculated from the following equations (5), (6) on the provision that there cannot be occurred a case whterein the vehicle during acceleration is slipping with the driving wheels being in locked conditions ($Vd_n=0$, $Vf_n \neq 0$) or a case wherein the driving wheels of the vehicle during deceleration in wheel spinning conditions while the vehicle is in a halted condition ($Vf_n=0$, $Vd_n \neq 0$).

In case $Af_n \geq 0$ and $Vd_n \neq 0$ are satisfied, $$S_n=(Vf_n-Vd_n)/Vd_n \quad (5)$$

In case $Af_n<0$ and $Vf_n \neq 0$ are satisfied, $$S_n=(Vf_n-VD_n)/Vf_n \quad (6)$$

At all other cases, $S_n=1$ shall be satisfied.

(6) Then, moving-averaging of the acceleration/deceleration of the vehicle and the slip ratios is performed for each sampling time.

A number of data exceeding a certain amount is required in performing linear regression, else the reliability of the obtained regression coefficient will be degraded. Thus, data are sampled for each sampling time, for example, several tens of ms, and upon performing moving-averaging of data of large variations which have been obtained during the sampling time, such variations in data can be reduced without decreasing the number of data. Here, N indicates the number of data.

As for the slip ratio, $$MS_n=(S_1+S_2+\ldots+S_n)/N \quad (7)$$

$$MS_{n+1}=(S_2+S_3+\ldots+S_{n+1})/N \quad (8)$$

$$MS_{n+2}=(S_3+S_4+\ldots+S_{n+2})/N \quad (9)$$

As for the acceleration/deceleration of the vehicle, $$MAf_n=(Af_1+Af_2+\ldots+Af_n)/N \quad (10)$$

$$MAf_{n+1}=(Af_2+Af_3+\ldots+Af_{n+1})/N \quad (11)$$

$$MAf_{n+2}=(Af_3+Af_4+\ldots+Af_{n+2})/N \quad (12)$$

The moving-averaged ship ratio and acceleration/deceleration of the vehicle are accumulated at every specified running distance. In case of estimating road surface conditions, it needs to be estimated in a short time, for instance, in not more than several seconds, since road surface conditions during running changes every moment. On the other hand, in case of setting a threshold for determining road surface conditions, the setting time is not required so short. Thus, data are accumulated over a specified distance of a relatively long distance for obtaining linear regression coefficient and correlation coefficient.

$$K1=(\Sigma(MAf_i \times MS_i)-N \times \overline{MAf} \times \overline{MS})/(\Sigma MAf_i^2-N \times \overline{MAF} \times \overline{MAf}) \quad (13)$$

$$K2=(\Sigma(MAf_i \times MS_i)-N \times \overline{MAf} \times \overline{MS})/(\Sigma MS_i^2-N \times \overline{MS} \times \overline{MS}) \quad (14)$$

Here, $\overline{MAf}$ and $\overline{MS}$ indicate average values of N-number of slip ratios and accelerations/decelerations of the vehicle which have been respectively moving-averaged.

Further, correlation coefficient RS will be $$RS=KS1 \times KS2 \quad (15)$$

(7) In case the correlation coefficient RS obtained through the above steps is not less than a specified value, for instance, 0.9, threshold L is calculated based on the linear regression coefficient KS1.

In case the correlation coefficient RS is not less than 0.9, it indicates that the road is a high $\mu$ road. Since a high $\mu$ road such as one of asphalt has stable road surface conditions, data will not be so much varied even though data are accumulated over a relatively long distance such that the correlation coefficient will be high. However, road surface conditions of a low $\mu$ road such as a compressed snowy road or a frozen snowy road are not stable so that data will be largely varied when data are accumulated over a relatively long distance, thereby the correlation coefficient will be low. Thus, by setting the linear regression coefficient KS1, which has been obtained upon recognizing that the road is a high $\mu$ road, as a reference value, it is possible to set a threshold peculiar to the presently mounted tires.

$$L=6KS1^2+0.4KS1+0.04 \quad (16)$$

This equation (16) has been calculated through experiments. The threshold L obtained from equation (16) is averaged by using previous values of L for updating.

In case the first obtained threshold is 0.122, and another threshold 0.118 has been obtained, the threshold will be $(0.122+0.118)/2=0.120$. In case an additional threshold 0.126 has been obtained, the threshold will become $(0.122+0.188+0.126)/3=0.122$.

In this manner, it is possible to cope with changes of tires with the passage of time as well. More particularly, it is possible to cope with cases in which the winter tires are worn or in which a hardness of the tread rubber has increased due to changes with the passage of time. Further, by performing averaging for setting a threshold, it is possible to restrict influences of one or two inappropriate regression coefficients, if ever obtained, to a minimum level and to converge proximate to values which are most frequently obtained.

On the other hand, since evaluation of road surface conditions needs to be performed in a short time, moving-averaged slip ratios and acceleration/deceleration of the vehicle are accumulated for a specified time, for instance, 2 seconds for obtaining linear regression coefficient KS1A and correlation coefficient RSA. In case the correlation coefficient RSA is not less than a specified value, for instance, 0.7, the linear regression coefficient KS1A is compared with the threshold L, and when the linear regression coefficient KS1A is larger than the threshold L, it is determined that the current condition is one in which slip is apt to occur so that alarm is issued to the driver accordingly.

While the apparatus for evaluating road surface conditions according to the present invention will now be explained based on examples thereof, the present invention is not to be limited to these examples only.

EXAMPLES 3 and 4

Two types of winter tires to be mounted to a vehicle as tires for four wheels of a front drive vehicle were Glass Pick DS-1 manufactured by Sumitomo Rubber Industries, Ltd. (Example 3) and Winter Sport M2 manufactured by German Dunlop Corporation (Example 4). As for a rubber hardness of these winter tires, that of the former was approximately 50 degrees while that of the latter was approximately 60 degrees.

As for the running conditions, the sampling time for the wheel speed of the wheels was set to 40 ms since a sampling time of 1 second was too long for obtaining a large number of data while eliminating variations and measurment errors.

The wheel speed was taken in based on wheel speed pulse in accordance with steps (1) to (7) for calculating acceleration/deceleration of the vehicle and the slip ratios of the front and rear wheels every 40 ms whereupon moving-averaging was performed. Next, for setting the threshold, linear regression coefficients KS1 and correlation coefficients RS of the acceleration/deceleration of the vehicle to the slip ratio were obtained for every 1,000 m of running distance. The threshold L was then calculated using the equation (16) based on the linear regression coefficients KS1 of which correlation coefficients RS were not less than 0.9. This was averaged by the previous thresholds L for updating as a new threshold.

On the other hand, for judging road surface conditions, the linear regression coefficients KS1A and correlation coefficients RSA were obtained on the basis of data of moving-averaged slip ratios and the acceleration/deceleration of the vehicle during 2 minutes, whereupon values of the linear regression coefficient KS1A having a correlation coefficient RSA of not less than 0.7 were compared with the threshold L.

Figure 5:
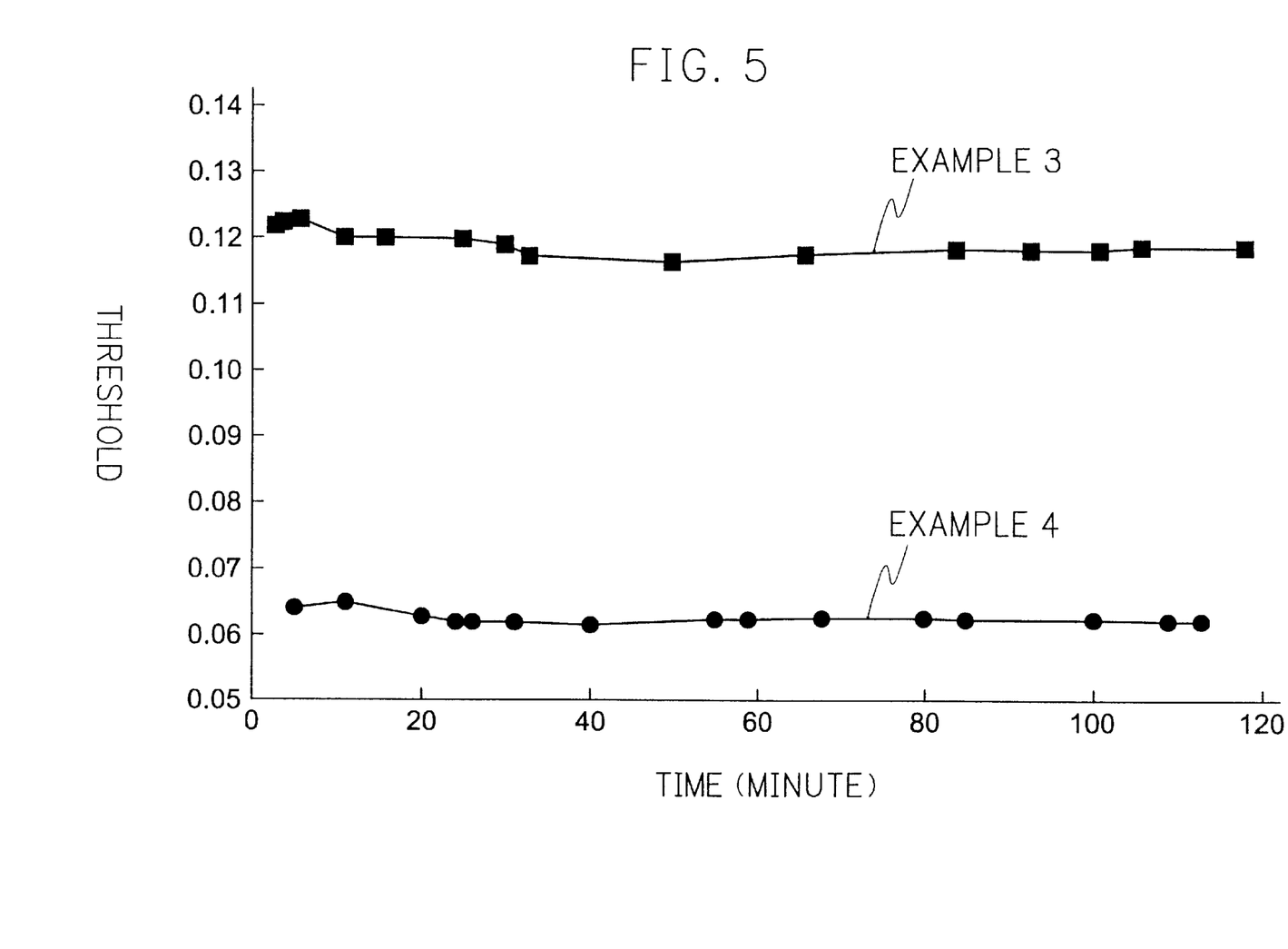
FIG. 5 is a diagram showing changes of thresholds with the passage of time.

FIG. 5 illustrates changes of the thresholds with the passage of time when the vehicle was made to run for approximately 2 hours on a dry asphalt road, a compressed snowy road and a frozen snowy road using the two types of tires (Example 3 and Example 4). As is also evident from FIG. 5, the thresholds of Example 3 continuously fell within the range from 0.117 to 0.123 whereas the thresholds of Example 4 moved in the range from 0.061 to 0.065, and it can be understood that the difference between these tires is evident. It can also be understood that the thresholds are stable and range at substantially identical values and that they are accurately obtained.

Figure 6A:
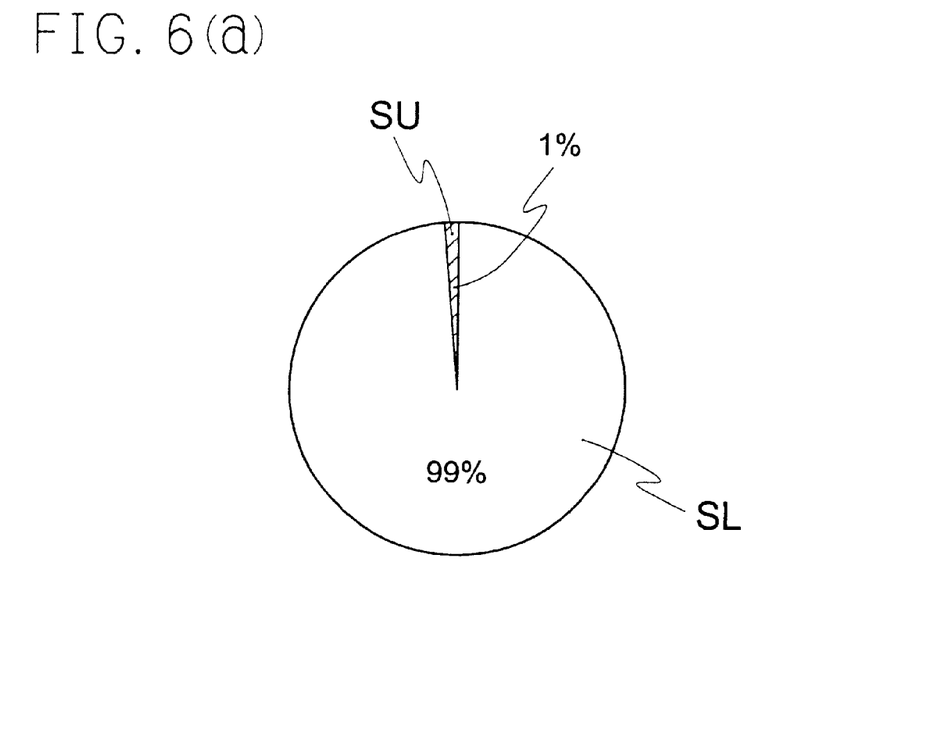
Figure 6B:
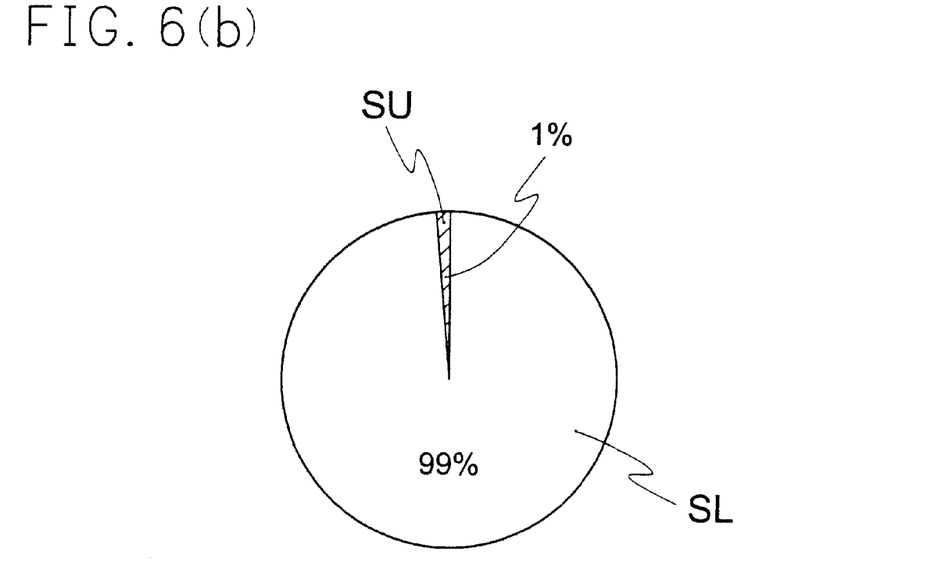
Figure 7A:
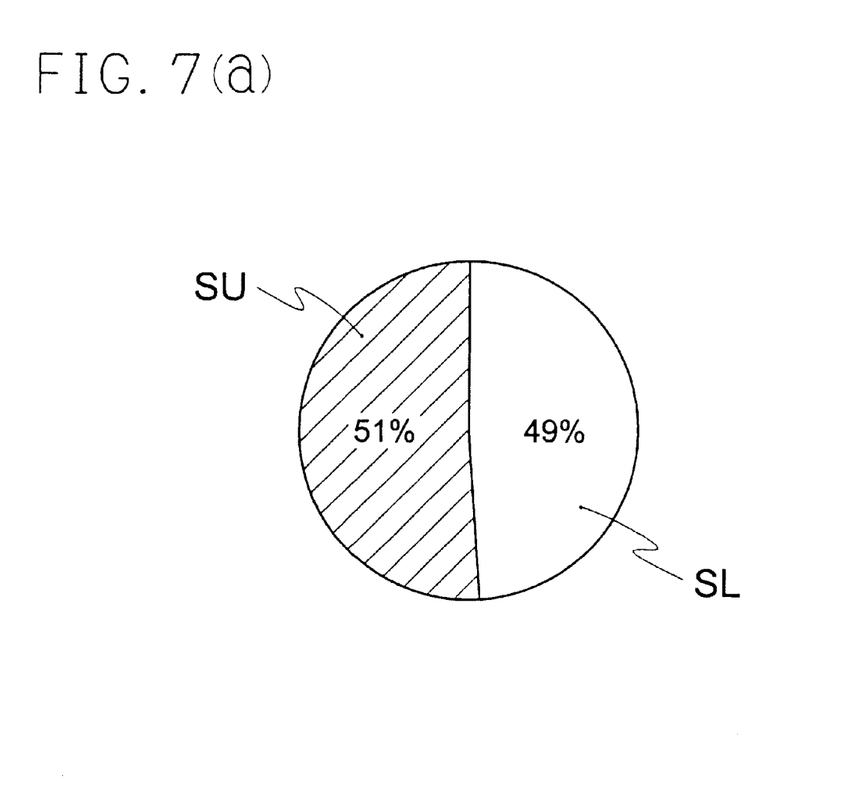
Figure 7B:
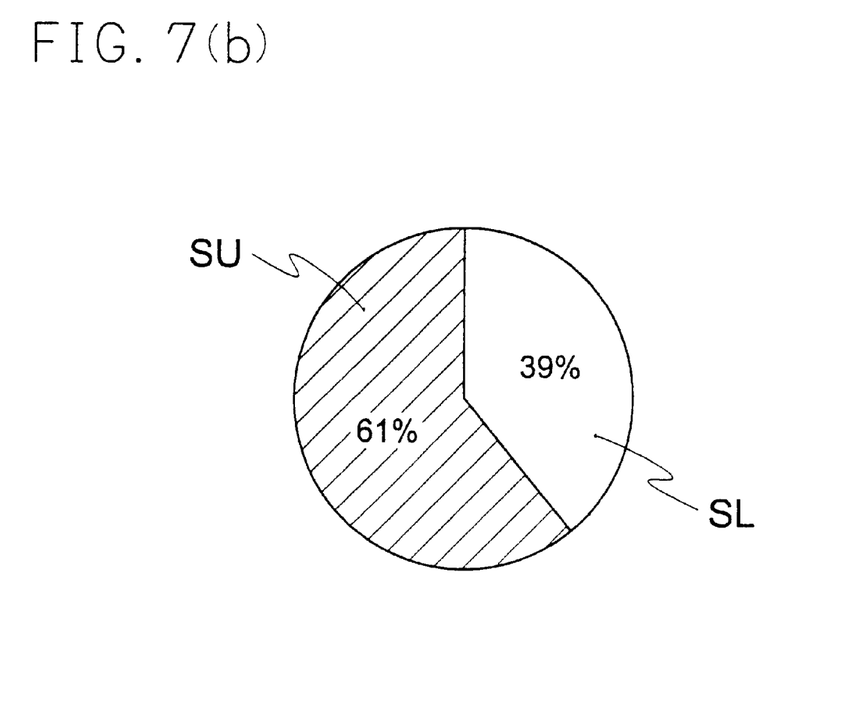
Figure 8A:
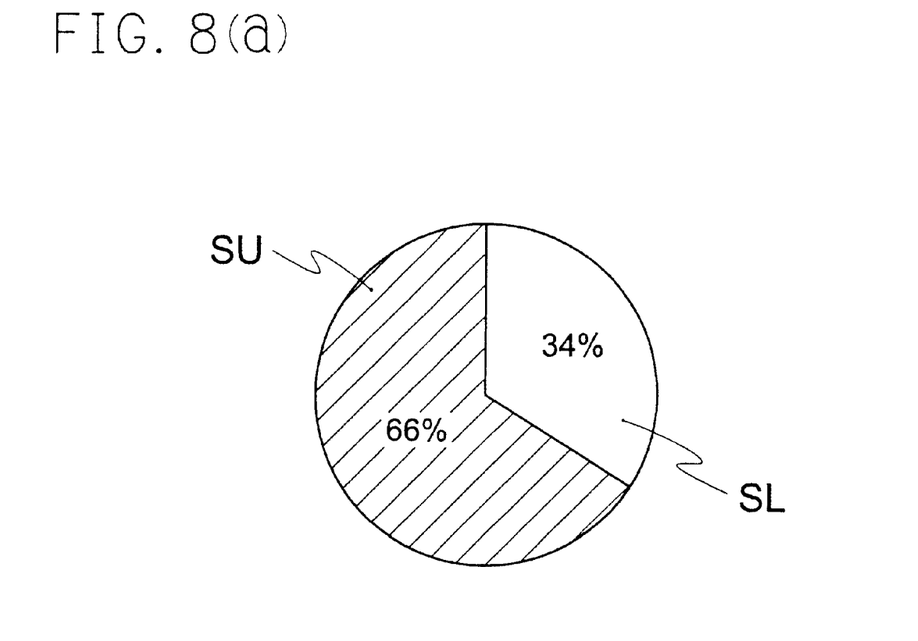
Figure 8B:
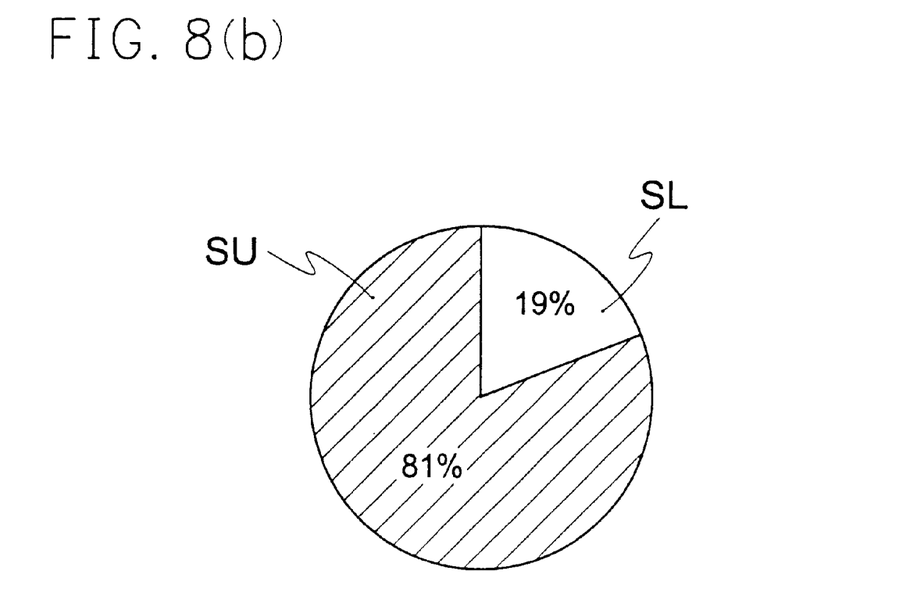

Next, there are illustrated in FIGS. 6 to 8 ratios of linear regression coefficients KS1A of the acceleration/deceleration of the vehicle to the slip ratio becoming larger than thresholds (ratios of alarming slip) when running on a dry asphalt road, a compressed snowy road and a frozen snowy road for 30 minutes, respectively. In FIGS. 6 to 8, SL indicates a ratio of values being less than the threshold while SU indicates a ratio of values being equal or more than the threshold.

As illustrated in FIGS. 6(a) and 6 (b), the linear regression coefficients K1 hardly became larger than the threshold in both, Examples 3 and 4, when running on a dry asphalt road. In other words, no alarm was issued. In contrast thereto, as illustrated in FIGS. 7(a) and 7 (b), the linear regression coefficients KS1A became larger than the threshold at ratios of approximately 51% in Example 3 and approximately 61% in Example 4 when running on a compressed snowy road and alarm was accordingly issued. Further, as illustrated in FIGS. 8(a) and 8 (b), the linear regression coefficients KS1A became larger than the threshold at ratios of approximately 66% in Example 3 and approximately 81% in Example 4 when running on a frozen snowy road so that alarm was accordingly issued. It can thus be understood that values of the thresholds are appropriate for suitably identifying differences in tendencies of slip of road surfaces.

As explained so far, since tires can be identified according to the present invention, differences in tread rigidities of the tires can be automatically reflected for controlling the vehicle. In an apparatus for alarming decrease in air-pressure in which rotational speeds of tires are used for judging decompression, the accuracy of detecting decompression of tires can be improved.

Moreover, since thresholds might be automatically set in accordance with tires which are presently mounted, it is possible to accurately evaluate road surface conditions.

What is claimed is:

1. An apparatus for identifying tires comprising:

a rotational speed detecting means for periodically detecting rotational speeds of tires of four wheels of a vehicle;

a first calculating means for calculating a vehicle speed based on a measured value obtained by the rotational speed detecting means;

a second calculating means for calculating acceleration/deceleration of the vehicle;

a third calculating means for calculating a slip ratio from the rotational speeds of the four wheels;

a fourth calculating means for respectively obtaining moving averages of the acceleration/deceleration and the slip ratios of the vehicle;

a fifth calculating means for obtaining linear regression coefficients and correlation coefficients of the moving-averaged acceleration/deceleration of the vehicle and the slip ratio;

a sixth calculating means for calculating a tire identifying coefficient based on the linear regression coefficients of which correlation coefficients of are not less than a specified value; and a tire identifying means for identifying tires which is presently mounted based on the tire identifying coefficient.

2. The apparatus of claim 1, wherein the apparatus further includes a calculating means for calculating a running distance of the vehicle in the case where the linear regression coefficients and correlation coefficients are obtained from data related to the moving-averaged acceleration/ deceleration of the vehicle and the slip ratio until the running distance has reached a specified distance.

3. A method for identifying tires comprising the steps of:

periodically detecting rotational speeds of tires of four wheels of a vehicle;

calculating a vehicle speed based on the measured rotational speed;

calculating acceleration/deceleration of the vehicle;

calculating a slip ratio from the rotational speeds of the four wheels;

respectively obtaining moving averages of the acceleration/deceleration and the slip ratios of the vehicle;

obtaining linear regression coefficients and correlation coefficients of the moving-averaged acceleration/ deceleration of the vehicle and the slip ratio;

calculating a tire identifying coefficient based on the linear regression coefficients of which correlation coefficients are not less than a specified value; and identifying tires which is presently mounted based on the tire identifying coefficient.

4. The method of claim 3, wherein the method further includes a step of calculating a running distance of the vehicle in the case where the linear regression coefficients and correlation coefficients are obtained from data related to the moving-averaged acceleration/deceleration of the vehicle and the slip ratio until the running distance has reached a specified distance.

5. An apparatus for evaluating road surface conditions comprising:

a rotational speed detecting means for periodically detecting rotational speeds of tires of four wheels of a vehicle;

a first calculating means for calculating a vehicle speed based on a measured value obtained by the rotational speed detecting means;

a second calculating means for calculating acceleration/ deceleration of the vehicle;

a third calculating means for calculating a slip ratio from the rotational speeds of the four wheels; a fourth calculating means for respectively obtaining moving averages of the acceleration/deceleration and the slip ratios of the vehicle;

a fifth calculating means for obtaining linear regression coefficients and correlation coefficients of the moving-averaged acceleration/deceleration of the vehicle and the slip ratios; and a threshold setting means for setting a threshold for evaluating road surface conditions based on the linear regression coefficients of which correlation coefficients are not less than a specified value.

6. The apparatus of claim 5, wherein the apparatus further includes a calculating means for calculating a running distance of the vehicle in the case where the linear regression coefficients and correlation coefficients are obtained from data related to the moving-averaged acceleration/ deceleration of the vehicle and the slip ratio until the running distance has reached a specified distance.

7. A method for evaluating road surface conditions comprising the steps of:

periodically detecting rotational speeds of tires of four wheels of a vehicle;

calculating a vehicle speed based on a measured value obtained by the rotational speed detecting means;

calculating acceleration/deceleration of the vehicle; calculating a slip ratio from the rotational speeds of the four wheels;

respectively obtaining moving averages of the acceleration/deceleration and the slip ratios of the vehicle; obtaining linear regression coefficients and correlation coefficients of the moving-averaged acceleration/deceleration of the vehicle and the slip ratios; and setting a threshold for evaluating road surface conditions based on the linear regression coefficients of which correlation coefficients are not less than a specified value.

8. The method of claim 7, wherein the method further includes a step of calculating a running distance of the vehicle in the case where the linear regression coefficients and correlation coefficients are obtained from data related to the moving-averaged acceleration/deceleration of the vehicle and the slip ratio until the running distance has reached a specified distance.

9. A program for evaluating road surface conditions which makes a computer for evaluating road surface conditions function as a first calculating means for calculating a vehicle speed based on a measured value obtained by a rotational speed detecting means, a second calculating means for calculating acceleration/deceleration of the vehicle, a third calculating means for calculating a slip ratio from the rotational speeds of the four wheels, a fourth calculating means for respectively obtaining moving averages of the acceleration/deceleration and the slip ratios of the vehicle, a fifth calculating means for obtaining linear regression coefficients and correlation coefficients of the moving-averaged acceleration/deceleration of the vehicle and the slip ratios, and a threshold setting means for setting a threshold for evaluating road surface conditions based on the linear regression coefficients of which correlation coefficients are not less than a specified value.

10. The program of claim 9, wherein the program further makes the computer function as a calculating means for calculating a running distance of the vehicle in the case where the linear regression coefficients and correlation coefficients are obtained from data related to the moving-averaged acceleration/deceleration of the vehicle and the slip ratio until the running distance has reached a specified distance.

* * * * *